(12) United States Patent
Chittineni et al.

(10) Patent No.: US 12,187,168 B2
(45) Date of Patent: Jan. 7, 2025

(54) SEAT TRACK STUD WITH ROLL FREEDOM

(71) Applicant: Safran Seats USA LLC, Gainesville, TX (US)

(72) Inventors: Lakshminarayana Chittineni, Little Elm, TX (US); Robert W. Trimble, Gainesville, TX (US); Klay E. Gilbert, Lindsay, TX (US); Erik Velazco, Corinth, TX (US); Shreyas Krishna, Frisco, TX (US); Yogesh Khankal, Denton, TX (US)

(73) Assignee: Safran Seats USA LLC, Gainesville, TX (US)

( * ) Notice: Subject to any disclaimer, the term of this patent is extended or adjusted under 35 U.S.C. 154(b) by 43 days.

(21) Appl. No.: 18/029,634

(22) PCT Filed: Oct. 5, 2020

(86) PCT No.: PCT/US2020/054284
§ 371 (c)(1),
(2) Date: Mar. 30, 2023

(87) PCT Pub. No.: WO2022/075968
PCT Pub. Date: Apr. 14, 2022

(65) Prior Publication Data
US 2023/0406163 A1 Dec. 21, 2023

(51) Int. Cl.
*B60N 2/00* (2006.01)
*B60N 2/015* (2006.01)
*B60N 2/07* (2006.01)

(52) U.S. Cl.
CPC ....... *B60N 2/0732* (2013.01); *B60N 2/01575* (2013.01)

(58) Field of Classification Search
None
See application file for complete search history.

(56) References Cited

U.S. PATENT DOCUMENTS 5,871,318 A * 2/1999 Dixon ............... B60N 2/01558
410/104
2014/0271021 A1* 9/2014 Cardona ............ B60N 2/01558
410/104

(Continued)

FOREIGN PATENT DOCUMENTS

EP 3266707 A1 1/2018
WO 2015198278 A1 12/2015

OTHER PUBLICATIONS

International Patent Application No. PCT/US2020/054284, International Search Report and Written Opinion, dated Jul. 27, 2021.

(Continued)

*Primary Examiner* — Steven M Marsh
(74) *Attorney, Agent, or Firm* — Kilpatrick Townsend & Stockton LLP

(57) ABSTRACT

Described is a seat track stud for attaching a passenger seat to a seat track having a first stud member, a second stud member, and a pin. The first stud member includes a base portion with at least one flanged edge, a first securing portion extending from the base portion and defining a first securing portion opening; and a second securing portion extending from the base portion at a location opposite the first securing portion and defining a second securing portion opening. The second stud member includes a connecting portion that defines a connecting portion opening and that is sized to fit between the first securing portion and the second securing portion. The pin extends through the first securing portion opening, the connecting portion opening, and the second securing portion opening.

19 Claims, 5 Drawing Sheets

(56) References Cited

U.S. PATENT DOCUMENTS

| | | | | |
|---|---|---|---|---|
| 2015/0041608 A1* | 2/2015 | Sawdy | ................ | B60N 2/0722 |
| | | | | 248/429 |
| 2015/0285283 A1* | 10/2015 | Danet | ................ | B60N 2/01575 |
| | | | | 403/322.4 |
| 2016/0107542 A1 | 4/2016 | Trimble et al. | | |
| 2016/0347208 A1* | 12/2016 | Sawdy | ................ | B60N 2/0806 |
| 2019/0291871 A1 | 9/2019 | Jacobson et al. | | |
| 2019/0300178 A1* | 10/2019 | Chadwell | ........... | B60N 2/01575 |

OTHER PUBLICATIONS

International Patent Application No. PCT/US2020/054284, Invitation to Pay Additional Fee and, Where Applicable, Protest Fee and Partial International Search Report, dated Jun. 4, 2021.

* cited by examiner

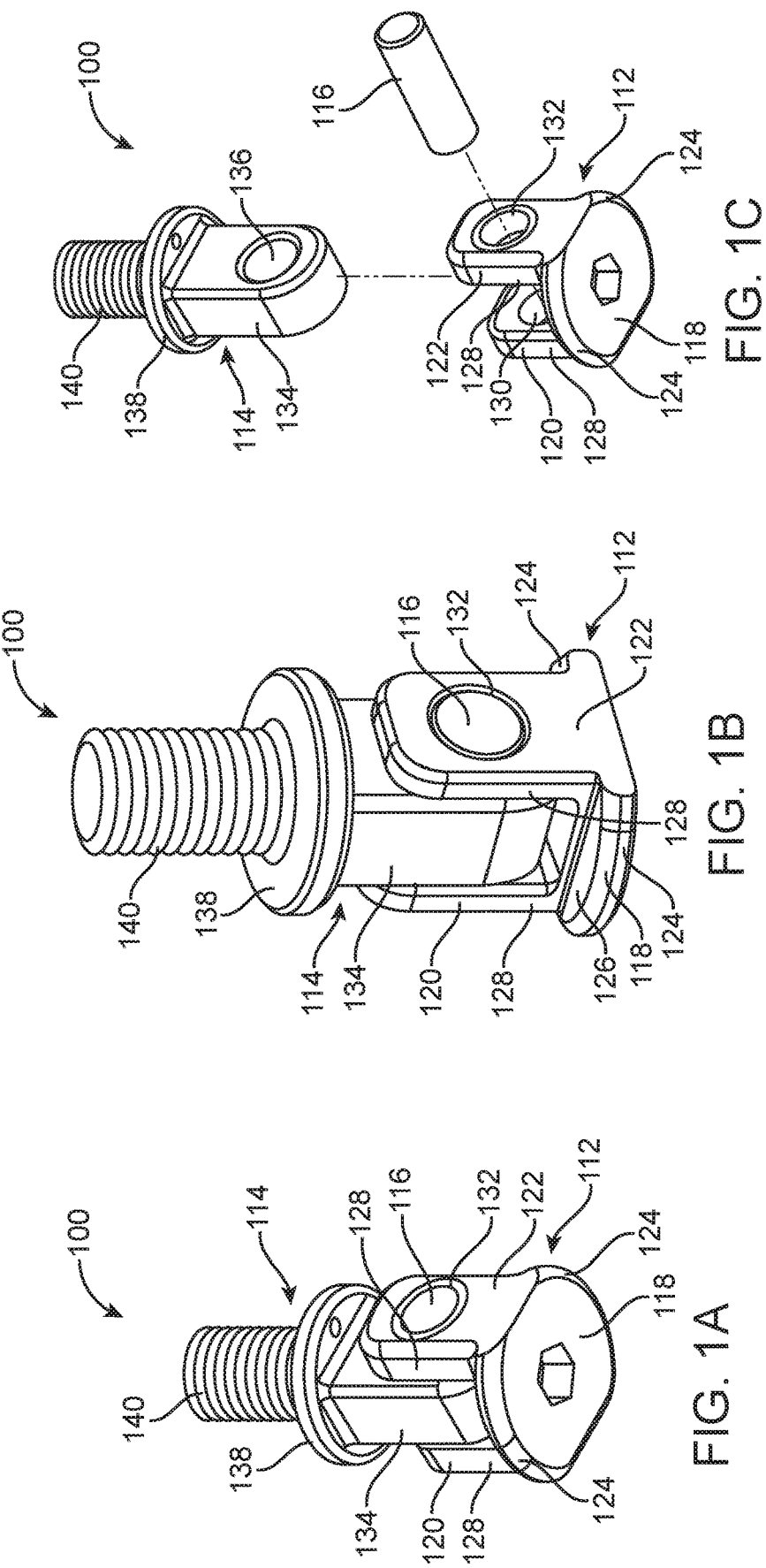

SEAT TRACK STUD WITH ROLL FREEDOM

FIELD OF THE INVENTION

The field of the invention relates to seat mounting assemblies for passenger vehicles.

BACKGROUND

Many vehicle seats such as those on passenger aircraft, buses, trains, and the like are removably mounted in a track secured to the floor of the vehicle. The tracks typically include a channel along their entire length, where two lips partially enclose the upper side of the channel to form a slot. Semicircular cutout portions are uniformly spaced along the lips to create a series of larger circular openings in the slot.

Typically, a track fitting assembly is used to couple the passenger seat to the track, where the track fitting assembly includes a front fitting and an aft fitting that each have studs that extend outwardly from the track fitting body. The studs are typically designed with a flared end attached to a narrower neck. The flared ends of the studs pass through the larger circular openings (e.g., in a vertical direction), and the track fitting assembly is moved along the track (e.g., in a horizontal direction) until the flared ends contact the underside of the slot lips. Standard threaded fasteners, bolts, or wedge-type elements are commonly used to create a snug fit between the studs and the track lips to prevent seat rattle and unintended seat displacement.

These typical track fitting assembly designs limit the moments transferred to the seat leg when the seat track is pitched and/or rolled per testing requirements. However, these designs still transfer a considerable amount of preload to the seat leg, which may result in the track fitting assembly designs either failing the testing requirements or causing damage to the track, e.g., the lips.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a seat track stud for attaching a passenger seat to a seat track comprises: a first stud member comprising: a base portion comprising at least one flanged edge; a first securing portion extending from the base portion and defining a first securing portion opening; and a second securing portion extending from the base portion at a location opposite the first securing portion and defining a second securing portion opening; a second stud member comprising a connecting portion, wherein the connecting portion is sized to fit between the first securing portion and the second securing portion and defines a connecting portion opening; and a pin that extends through the first securing portion opening, the connecting portion opening, and the second securing portion opening.

In some embodiments, the first securing portion and the second securing portion extend from the base portion in a substantially perpendicular direction.

In certain embodiments, the pin is friction fit into the first securing portion opening, the connecting portion opening, and the second securing portion opening.

The pin may permit rotational displacement of the second stud member relative to the first stud member.

The base portion, in some embodiments, comprises at least two extended portions that extend past the first securing portion and the second securing portion along the same plane as the at least one flanged edge.

The at least two extended portions, in certain embodiments, extend in a length direction perpendicular to a face of the first securing portion and a face of the second securing portion.

Each of the at least two extended portions may comprise at least one additional flanged edge.

In some embodiments, the second stud member comprises a ledge portion extending from the second stud member in a substantially perpendicular direction to a longitudinal axis of the second stud member.

In certain embodiments, the at least one flanged edge is engageable with a lower surface of an upper lip of the seat track.

A front leg of the passenger seat may be coupled with the seat track using the seat track stud.

The seat track stud, in some embodiments, reduces at least one stress exerted on the front leg.

The second stud member, in certain embodiments, is pivotable relative to the seat track.

A longitudinal axis of the pin in an installed state may be aligned substantially parallel with a longitudinal axis of the seat track.

In some embodiments, at least one disc spring is coupled with the second stud member to facilitate the alignment of the longitudinal axis of the pin with the longitudinal axis of the seat track.

According to certain embodiments of the present invention, a seat track stud for attaching a passenger seat to a seat track comprises: a flanged base portion; and a stud member extending from the flanged base portion and comprising two concave indentions, wherein the two concave indentions are positioned opposite one another on the stud member and permit flexing of the stud member.

In certain embodiments, the stud member extends from the flanged base portion in a substantially perpendicular direction.

The flanged base portion may comprise at least two extended portions and each of the at least two extended portions may comprise at least one flanged edge.

The stud member, in some embodiments, comprises a ledge portion extending from the stud member in a substantially perpendicular direction to a longitudinal axis of the stud member.

A front leg of the passenger seat, in certain embodiments, is coupled with the seat track using the seat track stud so that the seat track stud reduces at least one stress exerted on the front leg.

The two concave indentions may each have a separate longitudinal axis substantially parallel to one another, and wherein the separate longitudinal axes of the two concave indentions of the stud member in an installed state may be aligned substantially parallel with a longitudinal axis of the seat track.

BRIEF DESCRIPTION OF THE DRAWINGS

FIG. 1A is a bottom perspective view of a seat track stud, according to certain embodiments of the present invention.

FIG. 1B is a front perspective view of the seat track stud of FIG. 1A.

FIG. 1C is an exploded view of the seat track stud of FIG. 1A.

DETAILED DESCRIPTION

Figure 2B:
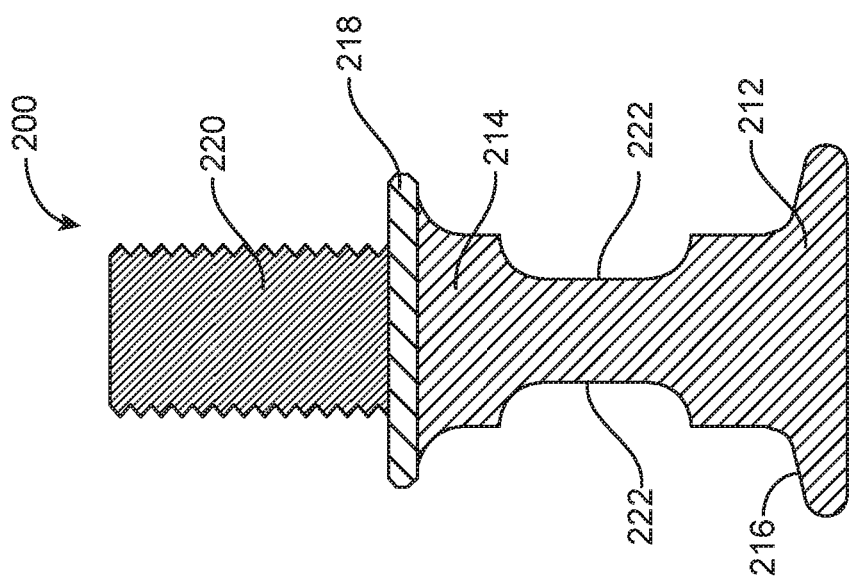
FIG. 2B is a front cutaway view of the seat track stud of FIG. 2A.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide seat track studs with roll freedom for passenger seats. While the seat track studs with roll freedom are discussed for use with aircraft seats, they are by no means so limited. Rather, embodiments of the seat track studs with roll freedom may be used in passenger seats or other seats of any type or otherwise as desired.

According to certain embodiments of the present invention, as shown in FIGS. 1A-1C, a seat track stud 100 with roll freedom includes a first stud member 112, a second stud member 114, and a pin 116.

The first stud member 112 includes a base portion 118, a first securing portion 120, and a second securing portion 122. In some embodiments, the base portion 118 may be at least partially square-shaped, circular-shaped, rectangular-shaped, triangular-shaped, hexagonal-shaped, polygonal-shaped, or any other suitable shape. The base portion 118 includes at least one flanged edge 124 that extends past at least one side edge 128 of the first securing portion 120 and the second securing portion 122. The at least one flanged edge 124 has an upper surface 126.

In some embodiments, the base portion 118 may have two flanged edges 124. The two flanged edges 124 may be positioned opposite to one another on the base portion 118. As discussed in more detail below regarding FIGS. 5A-6, the upper surface 126 of the at least one flanged edge 124 may be engageable with a seat track. The at least one flanged edge 124 may have an arced shape, a semicircular shape, a rectangular shape, or any other suitable shape.

In some embodiments, the first securing portion 120 and the second securing portion 122 extend from the base portion 118. The first securing portion 120 and the second securing portion 122 may each extend from the base portion 118 in a direction substantially perpendicular to the upper surface 126 of the base portion 118. The phrase "substantially" means within usual manufacturing tolerances. For example, a relative angle between one of the first securing portion 120 or the second securing portion 122 and the plane extending through the base portion 118 and parallel to the upper surface 126 may be between 85° and 95° and still be considered perpendicular in the context of the present disclosure. The first securing portion 120 may be positioned opposite to the second securing portion 122 on the base portion 118.

In some embodiments, the first securing portion 120 defines a first securing portion opening 130 that extends entirely through the first securing portion 120, and the second securing portion 132 defines a second securing portion opening 132 that extends entirely through the second securing portion 130. The first securing portion opening 130 and the second securing portion opening 132 may be similarly or equally sized and/or shaped. For example, the first securing portion opening 130 and the second securing portion opening 132 may each be substantially circular shaped.

The first securing portion opening 130 and the second securing portion opening 132 may be substantially aligned across the base portion 118. For example, a central axis may extend through the center of both the first securing portion opening 130 and the second securing portion opening 132.

In some embodiments, the second stud member 114 includes a connecting portion 134, a ledge portion 138, and a threaded portion 140. The ledge portion 138 may be located between connecting portion 134 and the threaded portion 140 and may be circular-shaped, square-shaped, rectangular-shaped, oval-shaped, triangular-shaped, hexagonal-shaped, etc. The ledge portion 138 may at least partially extend past the outer circumference or perimeter of the threaded portion 140 and may also at least partially extend past the outer edges of the connecting portion 134 (e.g., in a radial direction defined from a centerline of the second stud member 114). Thus, the ledge portion 138 may form a ledge on the second stud member 114. In use, the ledge portion 138 may provide a stop for a portion of a passenger seat leg to rest against, for example.

The connecting portion 134 is sized so that the connecting portion 134 at least partially fits between the first securing portion 120 and the second securing portion 122. For example, the connecting portion 134 may be sized so that a surface of the first securing portion 120 and a surface of the second securing portion 122 are in contact with the connecting portion 134 when the connecting portion 134 is positioned between the first securing portion 120 and the second securing portion 122. In fact, the connecting portion 134 may be sized so that the connecting portion 134 is friction fit between the first securing portion 120 and the second securing portion 122. In some embodiments, there may be space present between the connecting portion 134 and at least one of the first securing portion 120 or the second securing portion 122 when the connecting portion 134 is positioned between the first securing portion 120 and the second securing portion 122.

Additionally, the connecting portion 134 defines a connecting portion opening 136 that extends entirely through the connecting portion 134. The connecting portion opening 136 may be substantially aligned with the first securing portion opening 130 and the second securing portion opening 132 when the connecting portion 134 is inserted between the first securing portion 120 and the second securing portion 122. For example, a central axis may extend through the center of the first securing portion opening 130, the connecting portion opening 136, and the second securing portion opening 132. The connecting portion opening 136 may be substantially circular shaped and/or the same or similarly sized and/or shaped as the first securing portion opening 130 and the second securing portion opening 132.

In some embodiments, the pin 116 extends at least partially through the first securing portion 120, the connecting portion 134, and the second securing portion 122. The pin 116 couples the first stud member 112 to the second stud member 114 to form the seat track stud 100. Similar to the first securing portion opening 130, the connecting portion opening 136, and the second securing portion opening 132, the pin 116 may have a substantially circular cross-section.

The pin 116 may be any suitable length, and the circumference or perimeter of the pin 116 may be sized such that the pin 116 is friction fit within the first securing portion opening 130, the connecting portion opening 136, and/or the second securing portion opening 132. In some embodiments, the fit of the pin 116 within the first securing portion opening 130, the connecting portion opening 136, and the second securing portion opening 132 permits slight movement, e.g., rotational displacement, of the second stud member 114 relative to the first stud member 112.

Figure 5C:
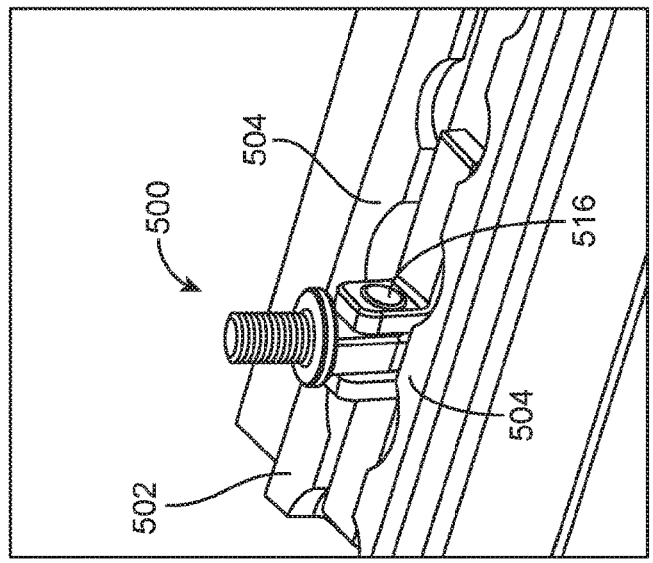
FIGS. 5A-5C are front perspective views of a seat track stud during installation into a seat track, according to certain embodiments of the present invention.
Figure 5B:
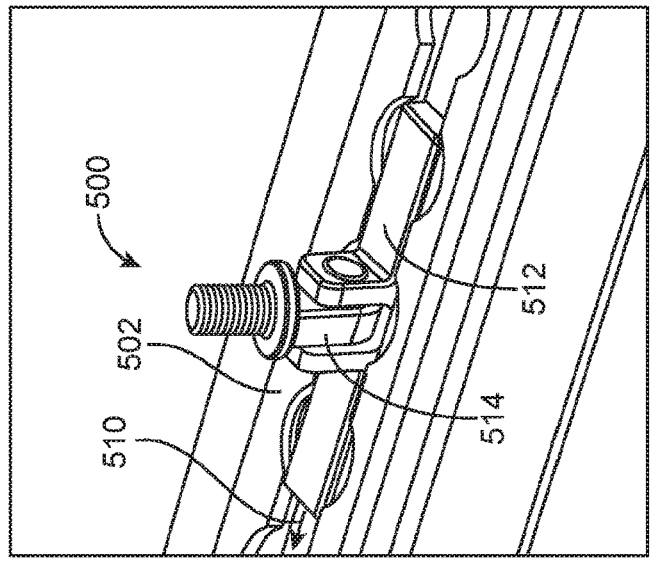
Figure 5A:
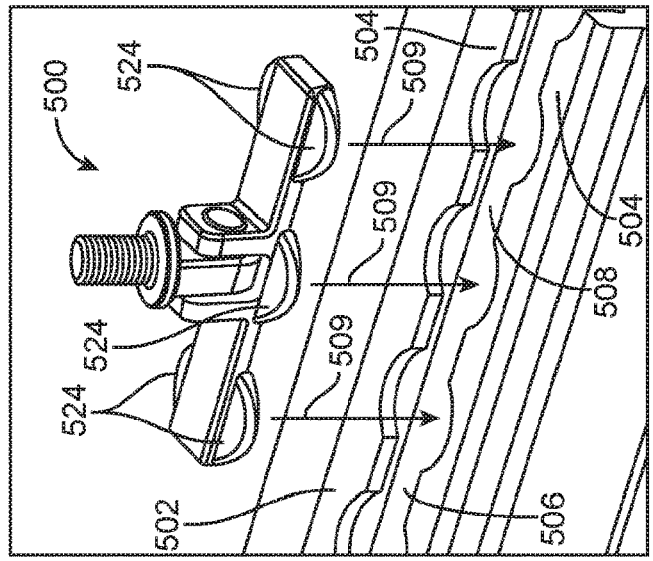

The seat track stud 100 may be formed from steel, steel alloy, stainless steel, titanium, or any other material suitable for providing the necessary strength to the seat track stud 100 to withstand the loads applied to the seat track stud 100 as described below in relation to FIGS. 5A-6. The material selected to form the seat track stud 100 may be at least 3 times the strength of the material used to form the seat track. Additionally, the material used to form the seat track stud 100 may be heat treated. For example, a steel from the 4000 series may be heat treated within a range of 160-180 KSI to from the seat track stud 100. In some embodiments, a 17-4 PH stainless steel may be head treated within a range of H900-H1100 to form the seat track stud 100.

A coating may be applied to the material used to form the seat track stud. This coating may be selected to prevent galvanic corrosion between the seat track stud 100 and the seat track, particularly when the seat track is formed from aluminum. It is understood that each feature of the seat track stud 100 may be formed of the same materials or of different materials.

In some embodiments, the seat track stud 100 may be formed so that the first securing portion 120 and the second securing portion 122 are integrally formed with the second stud member 114 and extend from the ledge portion 138. In such embodiments, the connecting member 134 is integrally formed with the first stud member 112 and extends from the base portion 118.

Figure 2A:
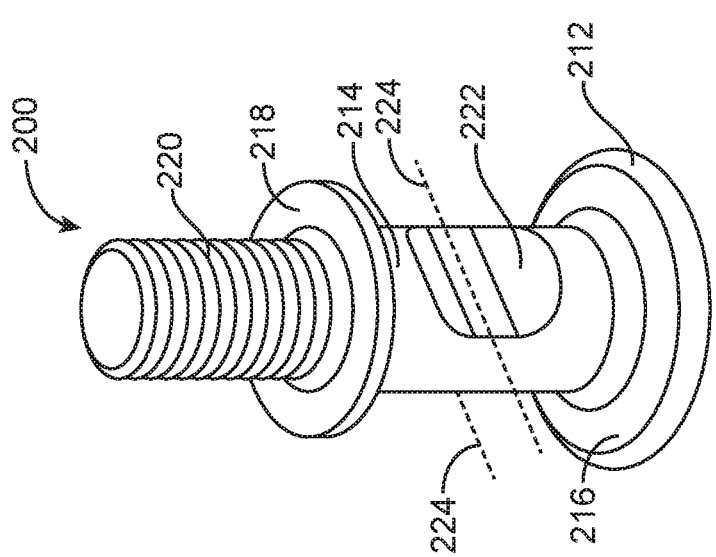
FIG. 2A is a front perspective view of a seat track stud, according to certain embodiments of the present invention.

According to certain embodiments of the present invention, as shown in FIGS. 2A-2B, a seat track stud 200 with roll freedom includes a flanged base portion 212 and a stud member 214.

The flanged base portion 212 has an upper surface 216 that extends past the outer circumference or perimeter of the stud member 214. In some embodiments, the flanged base portion 212 may be at least partially square-shaped, circular-shaped, rectangular-shaped, triangular-shaped, hexagonal-shaped, polygonal-shaped, or any other suitable shape. The stud member 214 may extend from the flanged base portion 212 in a substantially perpendicular direction to the upper surface 216.

The stud member 214 may include at least one indention 222 extending into the body of the stud member 214 to form a reduced neck area of the stud member 214. In some embodiments, the stud member 214 includes two concave indentions 222 that each have their own longitudinal axis 224. The two concave indentions 222 may be positioned opposite to one another on the stud member 214 so that the longitudinal axis 224 of each of the two concave indentions 222 are aligned and substantially parallel to one another. The symmetric positioning of the two concave indentions 222 on the stud member 214 may reduce a longitudinal cross-section of the stud member 214.

Having the two concave indentions 222 positioned in such a way opposite to one another on the stud member 214 permits flexing of the stud member 214. The central portion of the stud member 214 that extends between the two concave indentions 222 is sized to maintain the structural integrity of the seat track stud 200. Thus the stud member 214 may flex without breaking.

In some embodiments, the stud member 214 may include a ledge portion 218 and a threaded portion 220. The threaded portion 220 may be positioned at an end of the stud member 214 opposite to the flanged base portion 212. The ledge portion 218 extends from the stud member 214 in a direction that is substantially perpendicular to the longitudinal axis extending through the stud member 214. The ledge portion 218 may be positioned to separate the stud member 214 from the threaded portion 220.

Figure 4:
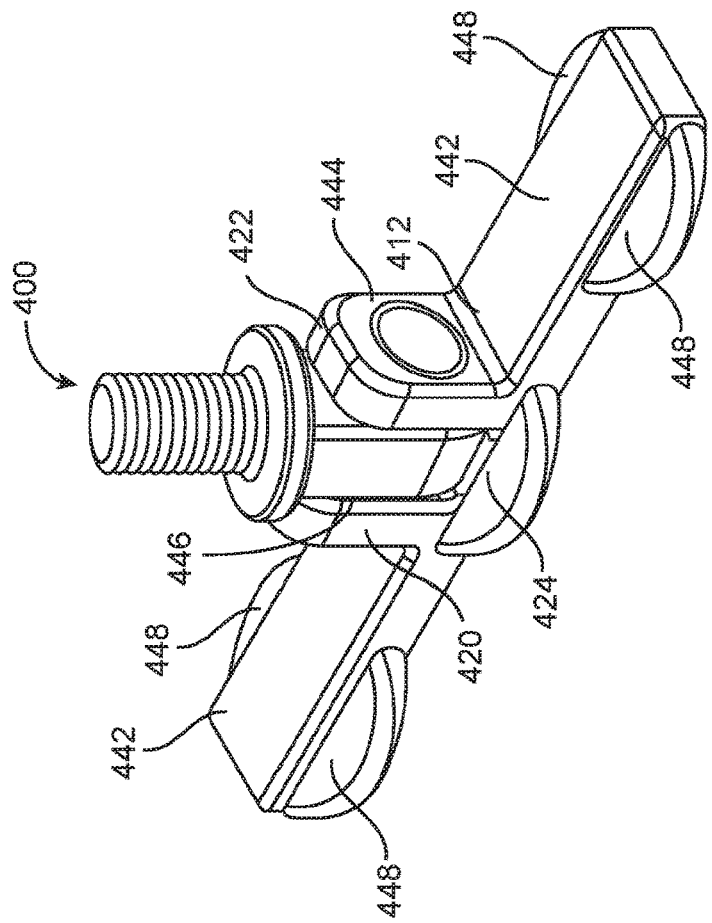
FIG. 4 is a front perspective view of a seat track stud, according to certain embodiments of the present invention.
Figure 3:
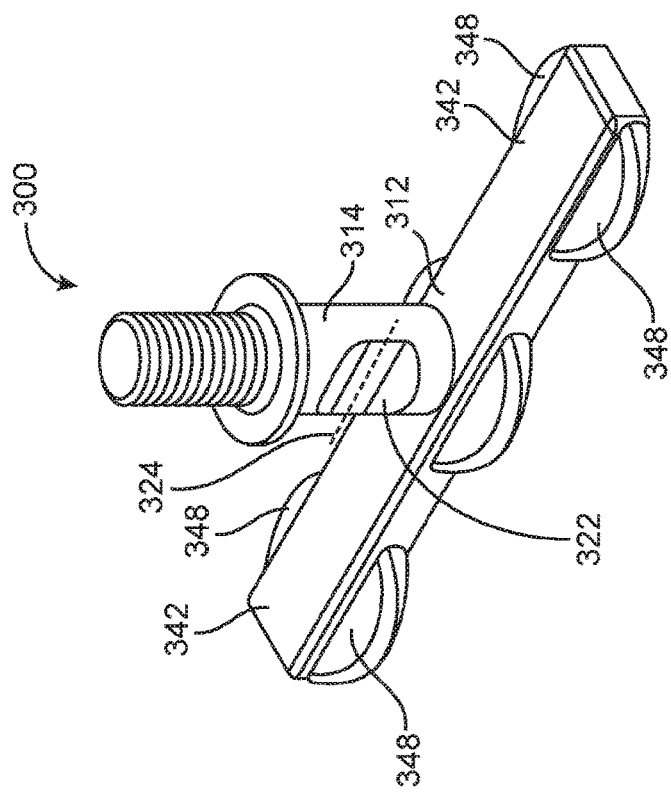
FIG. 3 is a front perspective view of a seat track stud, according to certain embodiments of the present invention.

According to certain embodiments of the present invention, as shown in FIGS. 3 and 4, the seat track stud 300 and the seat track stud 400 may each include at least one extended portion 342, 442. It should be noted that the seat track stud 300 may include the same or similar features as the seat track stud 200 described above with reference to FIGS. 2A-2B, and the seat track stud 400 may include the same or similar features as the seat track stud 100 described above with reference to FIGS. 1A-1C.

In some embodiments, the at least one extended portion 342, 442 is integrally formed with the base portion 312, 412. As best illustrated in FIG. 3, the seat track stud 300 may include two extended portions 342. These two extended portions 342 extend at least partially along the same plane as the at least one flanged base portion 312. More specifically, a longitudinal axis of the two extended portions 342 may run substantially parallel to a longitudinal axis 324 of the concave indentions 322 of the stud member 314. The two extended portions 342 may extend in a substantially linear direction with the stud member 314 positioned substantially central to the two extended portions 342.

As best illustrated in FIG. 4, the seat track stud 400 may include two extended portions 442. These two extended portions 442 extend at least partially along the same plane as the at least one flanged edge 424. More specifically, a longitudinal axis of the two extended portions 442 may run substantially perpendicular to a face 444 of the first securing portion 420 and a face 446 of the second securing portion 422. These two extended portions 442 may extend in a substantially linear direction with the first securing portion 420 and the second securing portion 422 positioned substantially central to the two extended portions 442.

In some embodiments, the at least one extended portion 342, 442 includes at least one additional flanged edge 348, 448. The at least one additional flanged edge 348, 448 may be positioned at any suitable location along the at least one extended portion 342, 442. For example, the at least one additional flanged edge 348 may be positioned at an edge of the at least one extended portion 342 opposite to the stud member 314, and the at least one additional flanged edge 448 may be positioned at an edge of the at least one extended portion 442 opposite the first securing portion 420 and the second securing portion 422. Additionally, the at least one additional flanged edge 348, 448 may have any suitable shape, e.g., at least partially square-shaped, circular-shaped, rectangular-shaped, triangular-shaped, hexagonal-shaped, polygonal-shaped, etc.

According to certain embodiments of the present invention, as shown in FIGS. and 6, a seat track stud 500 is engageable with a seat track 502, 602. It should be noted that the seat track stud 500 may include the same or similar features as the seat track stud 100, 200, 300, 400 described above with reference to FIGS. 1-4.

In some embodiments, the seat track 502 includes two upper lips 504 separated by a slot 506. The width of the slot 506 may vary along the length of the seat track 502. During installation of a passenger seat, the flanged edges 524 are aligned with the wider sections of the slot 506. The seat track stud 500 is then inserted into a channel 508 in the seat track 502 by passing the flanged edges 524 through the wider sections of the slot 506. The movement of the seat track stud 500 into the channel is represented by arrows 509 as best illustrated in FIG. 5A.

Once the seat track stud 500 is inserted into the channel 508, the seat track stud 500 may be translated longitudinally within the channel 508. This translation is represented by arrow 510 as best illustrated in FIG. 5B. The seat track stud 500 may be translated until the flanged edges 524 align with the thinner sections of the slot 506. When the flanged edges 524 are aligned with the thinner sections of the slot 506, the flanged edges 524 may then engage with a lower surface of the upper lips 504. By engaging with the lower surface of the upper lips 504, the seat track stud 500 may secure a leg of a passenger seat to the seat track 502 and may maintain the position of the seat track stud 500 along the seat track 502.

In some embodiments, in an installed state, the longitudinal axis of the pin 516 is aligned substantially parallel with the longitudinal axis of the seat track 502. Such alignment of the longitudinal axis of the pin 516 permits pivoting, or rotational displacement, of the second stud member 514 relative to the first stud member 512 and the seat track 502 when significant forces are applied to the seat track 502, such as those forces applied during pitch and rolling testing. The pivoting of the second stud member 514 may occur about the longitudinal axis of the pin 516. In some embodiments, the pitch and rolling testing may require a seat leg attached to the seat track stud 500 to be rolled along the longitudinal axis of the seat track 502 by 10° while simultaneously pitching an adjacent seat leg down or up by By permitting such roll freedom between the first stud member 512 and the second stud member 514, damage to the seat track 502 during application of such forces during pitch and rolling testing may be reduced.

Similar reduction of damage to the seat track 502 may occur when the seat track stud 100, 200, 300 is used to attach a passenger seat leg to the seat track 502. In those embodiments where the seat track stud 200, 300 is used, the longitudinal axes of the concave indentions may be aligned substantially parallel with a longitudinal axis of the seat track 502. Such alignment may similarly permit flexing of the stud member in a direction perpendicular to the longitudinal axis of the seat track 502 when significant forces are applied to the seat track 502, such as those forces applied during pitch and rolling testing.

Figure 6:
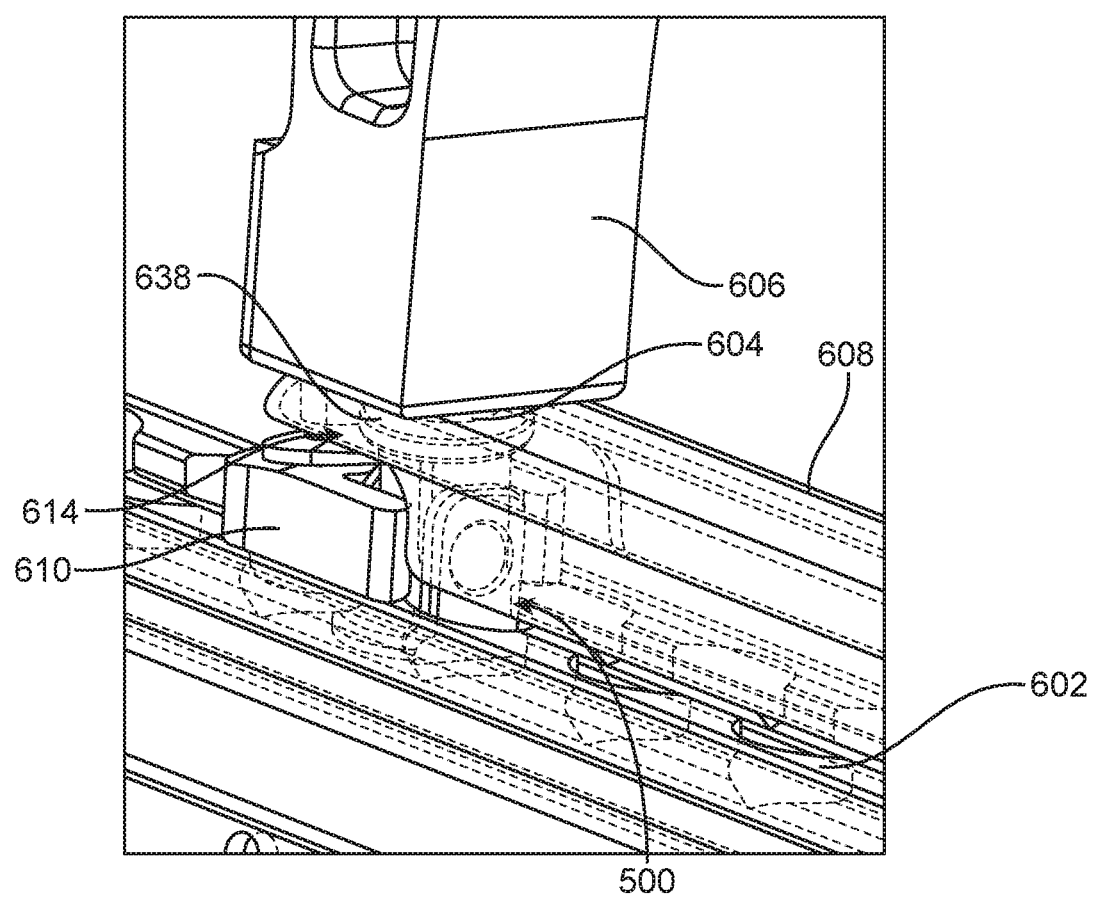
FIG. 6 is a front perspective view of a seat track stud installed into a seat track, according to certain embodiments of the present invention.

As best illustrated in FIG. 6, a passenger seat leg 606 may be coupled to the seat track stud 500 using the threaded portion located at the upper end of the seat track stud 500. While use of the seat track studs is mostly described in relation to the forward seat legs of the passenger seat, it is understood that the same seat track studs may be used for coupling the aft seat legs to a seat track. The rotational displacement of the second stud member 514 relative to the first stud member 512 (e.g., FIG. 5B), or the flexing of the stud member, may reduce at least one stress exerted on the passenger seat leg 606 (e.g., FIG. 6) when the pitch and rolling forces are applied to the seat track 602. Thus, the amount of preload transferred to the seat leg 606 may be reduced.

In some embodiments, a disc spring 604, e.g., a Belleville washer, may be used to assist with the alignment of the seat track stud 500 relative to the seat track 602 and may create a secure coupling between the seat track stud 500 and the passenger seat leg 606. For example, the disc spring 604 may be coupled to the second stud member 614 and positioned between the ledge portion 638 and at least one of a seat track cover 608 or the passenger seat leg 606. When coupling the passenger seat leg 606 to the seat track stud 500 using the threaded portion of the seat track stud 500, the disc spring 604 enables additional torque to be applied past the required torque to maintain a secure coupling between the passenger seat leg 606 and the seat track stud 500. This ability to apply additional torque may permit more precise adjustments of the alignment of the seat track stud 500 relative to the seat track 602.

Additionally, an alignment tool 610 may be used to adjust the alignment of the seat track stud 500 relative to the seat track 602 to ensure that the longitudinal axis of the pin of the seat track stud 500, or the longitudinal axes of the concave indentions, are aligned substantially parallel to the longitudinal axis of the seat track 602. The alignment tool 610 may be coupled to a portion of the seat track stud 500, e.g., to the at least one of the first securing portion, the connecting portion, the second securing portion, or the stud member to adjust the alignment.

Elements of any of the embodiments discussed above may be fully interchangeable with one another. In the following, further examples are described to facilitate the understanding of the invention (and in some aspects, features of an apparatus or system described in one or more of these examples can be utilized in a method described in one of the other examples or vice versa):

Example 1. A seat track stud (which may incorporate features of any of the subsequent examples) for attaching a passenger seat to a seat track, the seat track stud comprising: a first stud member comprising: a base portion comprising at least one flanged edge; a first securing portion extending from the base portion and defining a first securing portion opening; and a second securing portion extending from the base portion at a location opposite the first securing portion and defining a second securing portion opening; a second stud member comprising a connecting portion, wherein the connecting portion is sized to fit between the first securing portion and the second securing portion and defines a connecting portion opening; and a pin that extends through the first securing portion opening, the connecting portion opening, and the second securing portion opening.

Example 2. The seat track stud of Example 1 or any of the preceding or subsequent examples, wherein the first securing portion and the second securing portion extend from the base portion in a substantially perpendicular direction.

Example 3. The seat track stud of Example 1 or any of the preceding or subsequent examples, wherein the pin is friction fit into the first securing portion opening, the connecting portion opening, and the second securing portion opening.

Example 4. The seat track stud of Example 1 or any of the preceding or subsequent examples, wherein the pin permits rotational displacement of the second stud member relative to the first stud member.

Example 5. The seat track stud of Example 1 or any of the preceding or subsequent examples, wherein the base portion comprises at least two extended portions that extend past the first securing portion and the second securing portion along the same plane as the at least one flanged edge.

Example 6. The seat track stud of Example 5 or any of the preceding or subsequent examples, wherein the at least two extended portions extend in a length direction perpendicular to a face of the first securing portion and a face of the second securing portion.

Example 7. The seat track stud of Example 5 or any of the preceding or subsequent examples, wherein each of the at least two extended portions comprises at least one additional flanged edge.

Example 8. The seat track stud of Example 1 or any of the preceding or subsequent examples, wherein the second stud member comprises a ledge portion extending from the second stud member in a substantially perpendicular direction to a longitudinal axis of the second stud member.

Example 9. The seat track stud of Example 1 or any of the preceding or subsequent examples, wherein the at least one flanged edge is engageable with a lower surface of an upper lip of the seat track.

Example 10. The seat track stud of Example 1 or any of the preceding or subsequent examples, wherein a front leg of the passenger seat is coupled with the seat track using the seat track stud.

Example 11. The seat track stud of Example 10 or any of the preceding or subsequent examples, wherein the seat track stud reduces at least one stress exerted on the front leg.

Example 12. The seat track stud of Example 10 or any of the preceding or subsequent examples, wherein the second stud member is pivotable relative to the seat track.

Example 13. The seat track stud of Example 10 or any of the preceding or subsequent examples, wherein a longitudinal axis of the pin in an installed state is aligned substantially parallel with a longitudinal axis of the seat track.

Example 14. The seat track stud of Example 13 or any of the preceding or subsequent examples, wherein at least one disc spring is coupled with the second stud member to facilitate the alignment of the longitudinal axis of the pin with the longitudinal axis of the seat track.

Example 15. A seat track stud (which may incorporate features of any of the preceding or subsequent examples) for attaching a passenger seat to a seat track, the seat track stud comprising: a flanged base portion; and a stud member extending from the flanged base portion and comprising two concave indentions, wherein the two concave indentions are positioned opposite one another on the stud member and permit flexing of the stud member.

Example 16. The seat track stud of Example 15 or any of the preceding or subsequent examples, wherein the stud member extends from the flanged base portion in a substantially perpendicular direction.

Example 17. The seat track stud of Example 15 or any of the preceding or subsequent examples, wherein the flanged base portion comprises at least two extended portions and each of the at least two extended portions comprises at least one flanged edge.

Example 18. The seat track stud of Example 15 or any of the preceding or subsequent examples, wherein the stud member comprises a ledge portion extending from the stud member in a substantially perpendicular direction to a longitudinal axis of the stud member.

Example 19. The seat track stud of Example 15 or any of the preceding or subsequent examples, wherein a front leg of the passenger seat is coupled with the seat track using the seat track stud so that the seat track stud reduces at least one stress exerted on the front leg.

Example 20. The seat track stud of Example 19 or any of the preceding examples, wherein the two concave indentions each have a separate longitudinal axis substantially parallel to one another, and wherein the separate longitudinal axes of the two concave indentions of the stud member in an installed state are aligned substantially parallel with a longitudinal axis of the seat track.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A seat track stud for attaching a passenger seat to a seat track, the seat track stud comprising:
   a first stud member comprising:
      a base portion comprising at least one flanged edge;
      a first securing portion extending from the base portion and defining a first securing portion opening; and
      a second securing portion extending from the base portion at a location opposite the first securing portion and defining a second securing portion opening;
   a second stud member comprising a connecting portion, wherein the connecting portion is sized to fit between the first securing portion and the second securing portion and defines a connecting portion opening; and
   a pin that extends through the first securing portion opening, the connecting portion opening, and the second securing portion opening,
   wherein the second stud member comprises a ledge portion extending from the second stud member in a substantially perpendicular direction to a longitudinal axis of the second stud member, and wherein the ledge portion is positioned between the connecting portion and a second portion of the second stud member.

2. The seat track stud of claim 1, wherein the first securing portion and the second securing portion extend from the base portion in a substantially perpendicular direction.

3. The seat track stud of claim 1, wherein the pin is friction fit into the first securing portion opening, the connecting portion opening, and the second securing portion opening.

4. The seat track stud of claim 1, wherein the pin permits rotational displacement of the second stud member relative to the first stud member.

5. The seat track stud of claim 1, wherein the base portion comprises at least two extended portions that extend past the first securing portion and the second securing portion along the same plane as the at least one flanged edge.

6. The seat track stud of claim 5, wherein the at least two extended portions extend in a length direction perpendicular to a face of the first securing portion and a face of the second securing portion.

7. The seat track stud of claim 5, wherein each of the at least two extended portions comprises at least one additional flanged edge.

8. The seat track stud of claim 1, wherein the ledge portion at least partially extends past an outer perimeter of the second portion of the second stud member.

9. The seat track stud of claim 1, wherein the at least one flanged edge is engageable with a lower surface of an upper lip of the seat track.

10. The seat track stud of claim 1, wherein a front leg of the passenger seat is coupled with the seat track using the seat track stud.

11. The seat track stud of claim 10, wherein the seat track stud reduces at least one stress exerted on the front leg.

12. The seat track stud of claim 10, wherein the second stud member is pivotable relative to the seat track.

13. The seat track stud of claim 10, wherein a longitudinal axis of the pin in an installed state is aligned substantially parallel with a longitudinal axis of the seat track.

14. The seat track stud of claim 13, wherein at least one disc spring is coupled with the second stud member to facilitate the alignment of the longitudinal axis of the pin with the longitudinal axis of the seat track.

15. A seat track stud for attaching a passenger seat to a seat track, the seat track stud comprising:
  a flanged base portion; and
  a stud member extending from the flanged base portion and comprising two concave indentions, wherein the two concave indentions are positioned opposite one another on the stud member and permit flexing of the stud member;
  wherein a front leg of the passenger seat is coupled with the seat track using the seat track stud so that the seat track stud reduces at least one stress exerted on the front leg.

16. The seat track stud of claim 15, wherein the stud member extends from the flanged base portion in a substantially perpendicular direction.

17. The seat track stud of claim 15, wherein the flanged base portion comprises at least two extended portions and each of the at least two extended portions comprises at least one flanged edge.

18. The seat track stud of claim 15, wherein the stud member comprises a ledge portion extending from the stud member in a substantially perpendicular direction to a longitudinal axis of the stud member, and wherein the ledge portion is positioned between a first portion of the stud member and a second portion of the stud member.

19. The seat track stud of claim 15, wherein the two concave indentions each have a separate longitudinal axis substantially parallel to one another, and wherein the separate longitudinal axes of the two concave indentions of the stud member in an installed state are aligned substantially parallel with a longitudinal axis of the seat track.

* * * * *